United States Patent [19]

Göertz

[11] Patent Number: 5,422,884
[45] Date of Patent: Jun. 6, 1995

[54] LOCAL COMMUNICATION SYSTEM AND FRAME FORMING COMPRISING A PROGRAMMABLE ADDRESS GENERATOR FOR SUCH A SYSTEM

[75] Inventor: Hendrik M. H. G. Göertz, Eindhoven, Netherlands

[73] Assignee: U.S. Philips Corporation, New York, N.Y.

[21] Appl. No.: 696,450

[22] Filed: May 6, 1991

[30] Foreign Application Priority Data

Jan. 14, 1991 [EP] European Pat. Off. ............ 91200055

[51] Int. Cl.⁶ .............................................. H04L 12/40
[52] U.S. Cl. .................................... 370/85.1; 370/92; 370/94.1; 340/825.07
[58] Field of Search .................... 370/92, 94.1, 94.2, 370/60, 60.1, 85.1, 85.2, 85.3, 85.4, 85.7, 85.15; 340/825.05, 825.06, 825.07

[56] References Cited

U.S. PATENT DOCUMENTS 4,287,592  9/1981  Paulish et al. ................ 370/92
4,897,834  1/1990  Peterson et al. .............. 370/85.1

FOREIGN PATENT DOCUMENTS 0344609  12/1989  European Pat. Off. ..... H04L 11/16

Primary Examiner—Wellington Chin
Attorney, Agent, or Firm—Anne E. Barschall

[57] ABSTRACT

In a local communication system a frame forming device is provided which makes it possible to connect signal sources that are designed to have a private connection to a destination device (and therefore produce signals that are unspecific for selection of destination devices), via a shareable bus to the destination device. To determine to which destination device a signal source is connected, the frame forming device contains an address generator. By making functions of the address generator programmable via the bus the system connections are made flexible.

26 Claims, 3 Drawing Sheets

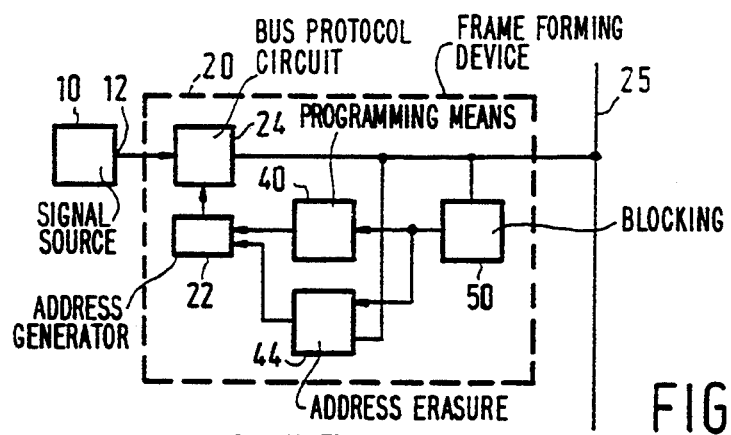
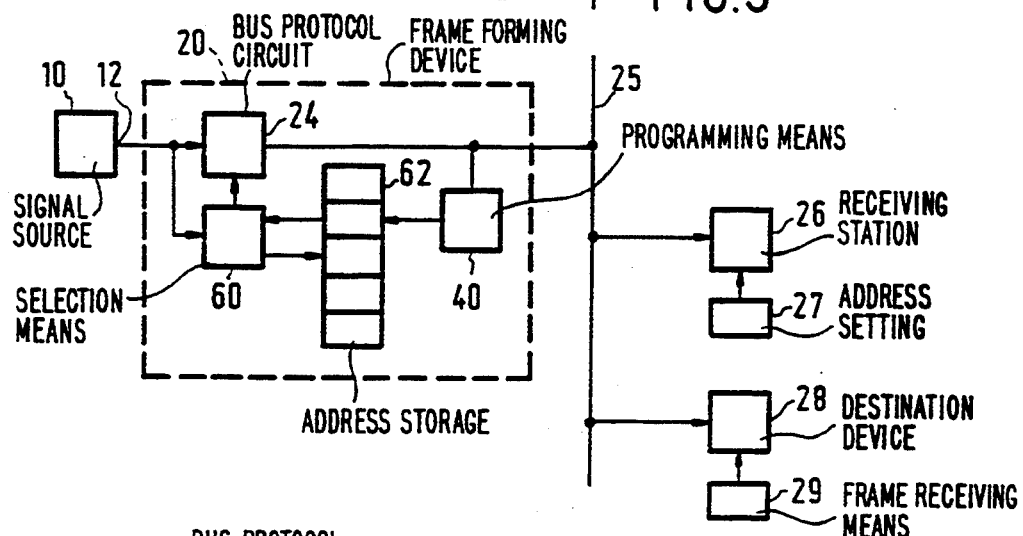
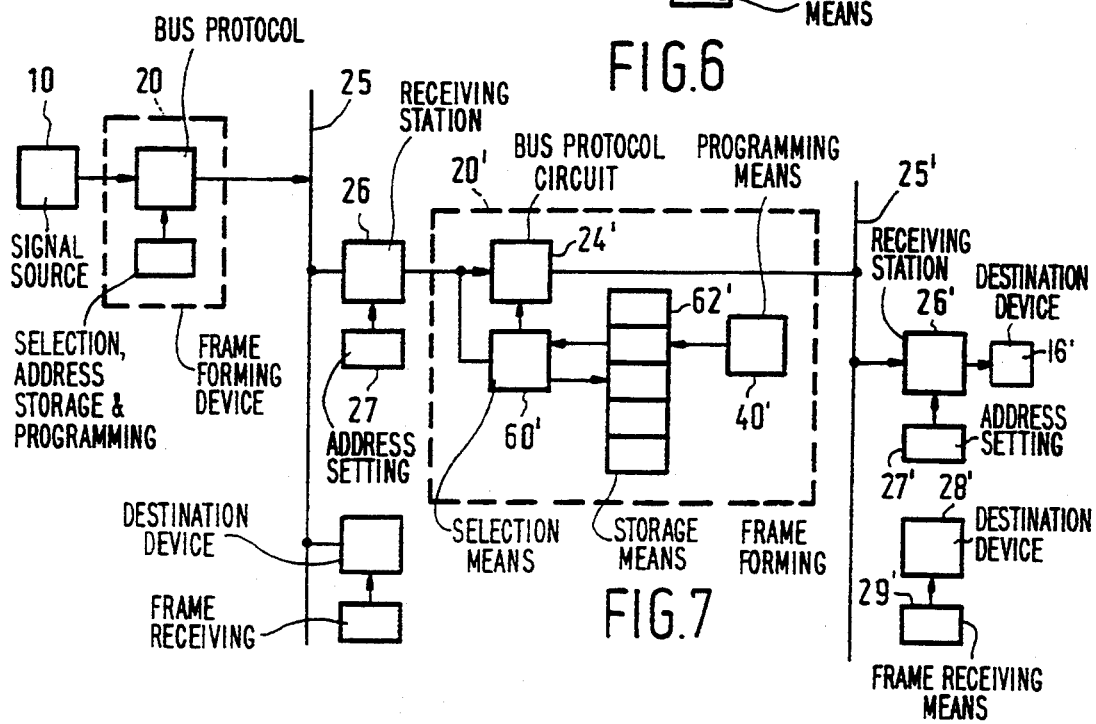

LOCAL COMMUNICATION SYSTEM AND FRAME FORMING COMPRISING A PROGRAMMABLE ADDRESS GENERATOR FOR SUCH A SYSTEM

BACKGROUND OF THE INVENTION

The invention relates to a local communication system, in which a signal source is able to send signals to a destination device. As an example, the invention relates to a switch (the signal source) which is physically separated from an electrical appliance (the destination device), for example because the switch and the appliance are located at different location in a building. In another example, the signal source is a computer and the destination device is a printer placed apart from the computer.

Such signal sources produce destination unspecific signals, that is, if more than one appliance were connected to the source, a signal from the signal source would affect them all; for example, a switch would affect all lamps connected to it, and all printers connected to one computer printer port would print in response to character codes.

Conventionally, for selective source-destination device communication, a separate private connection between each pair of source-destination device would be needed.

To improve upon this situation, it is known to use a shareable serial bus as connection between sources and destination devices.

Over a serial bus, successive bits of data are transmitted in time serial succession. Hence a serial bus requires only few wires for transferring an arbitrary amount of information (one signal wire plus a ground may suffice) therefore, it does not need to be more complicated, at least as a physical connection, than a direct signal source-destination device connection. This makes a serial bus very suitable for use for example in control systems in buildings.

Via a serial bus, frames carrying messages composed of successive items of information can be transmitted from one station to another. When such frames comprise, in series with other information, a destination address that determines a destination device for which the frame is destined, the bus can be shared by more than one such destination device. The advantage of sharing is that only one connection is needed to connect all destination devices and signal sources, thus reducing the overall number of connections needed for signal passing. Furthermore, adding stations or changing the connection pattern does not require a change of connection wiring. In general, signal transfers can be performed without need to know the physical location of the signal source and destination device concerned.

It would be desirable to use the shareable bus for any possible apparatus. However, in this case it is a problem that many existing signal sources which produce destination unspecific signals cannot send signals only to a selected destination device via a shareable bus.

SUMMARY OF THE INVENTION

Amongst others, it is an object of the invention to provide for the coupling of destination unspecific signal sources, to a shareable bus, providing facilities for flexible programming of connections.

To attain the objects, there is provided a signal source with a signal output, for coupling a destination unspecific signal to a frame forming device, which is physically separate from the signal source, the frame forming device being provided for forming, in response to the destination unspecific signal, a source frame for transmission over a serial, shareable bus, the source frame comprising a destination address field, containing a programmed address generated by a programmable address generator, which is comprised in the frame forming device, the shareable bus being coupled to a frame receiving device, reactive to a transmitted frame which has a frame receiving device address specific for the frame receiving device in the destination address field;

In such a communication system, the signal source does not require the intelligence neccessary for using the shareable bus. Instead, the frame forming device, which serves as an intermediary between the signal source and the shareable bus, contains the necessary intelligence in such a way that the signal source can be kept physically separate, that is, the signal source can operate as if it is connected entirely via a separate private connection.

The frame forming device converts the unspecific signal, which it receives on an external input, into a source frame. The address generator supplies the neccessary destination address, determining to which receiving device the signal source is effectively connected.

It is a further object of the invention to make the local communication system flexible through the implementation of the way in which the address generator functions.

In one embodiment, the local communication system is characterized in that it comprises a coordinating processor for transmitting, via the shareable bus, programming frames, comprising the destination field a frame forming device address, the frame forming device comprising programming means, for, in response to reception of the programming frame from the shareable bus, deriving a programming address from a content of the programming frame and thereby programming the address generator As an example of an application, a coordinating processor, also connected to the shareable bus, might change the connection of a lightswitch to a lamp daily after sunrise or sunset, such that subsequent activation of the lightswitch will cause a different lamp to go on depending on whether it is day or night; or a door button might be connected to an alarm device depending on the activities of the person that must be alerted, such that the alarm would subsequently go off at a different place when the door button is pushed. After such a change, the local communication system functions without need for the coordinating processor, which will therefore not get overloaded with switch on/off messages. Nor will the entire system go down if the coordinating processor goes down.

Another embodiment of the local communication system according to the invention is characterized in that the address generator comprises storage means, for storing a plurality of programmed addresses, the frame forming device comprising sequence forming means, for forming a sequence of source frames in response to the destination unspecific signal, each of the plurality of programmed addresses being comprised in at least one frame of the sequence of source frames. In this way, the signal source can, for example, be made to control a programmed plurality of lamps, the plurality being reprogrammed at sunset or sunrise.

A further embodiment of the local communication system according to the invention is characterized, in that the frame forming device comprises erasure means, for, after reception of an erasure command, preventing a transmission of the source frame comprising the programmed address in response to the unspecific signal. By erasure, it is possible effectively to disconnect the signal source. The same effect may be achieved by programming the address of an unused destination address, but erasure has the advantage of lowering bus usage. The erasure means may be activated by a reset button, or the local communication system may be characterized, in that to the erasure means are controlled by physically actuable reset means at the frame forming device.

Under some circumstances, it may be desirable to avoid changes in connection during critical periods. For example, when a computer is transmitting a text to a printer via a frame forming device in a series of successive source frames, it would be undesirable to have the destination address, and hence the printer changed halfway. To avoid this one embodiment of the local communication device is characterized in that the local communication system comprises a blocking unit for transmitting, via the shareable bus, a blocking frame, destined for the frame forming device, the frame forming device comprising blocking means for blocking programming of the address generator in response to the blocking frame. Blocking and programming may be combined into one command; thus, after it is programmed, a connection will be unchangeable until it is erased.

Advantageously, the address generator may comprise a non-volatile, writable memory for storing any programmed address. A non volatile writable memory, such as for example an EEPROM (Electrically Erasable Programmable Read Only Memory), or a magnetic memory, enables programming of connections which are unaffected by power failures.

Additional flexibility can be achieved by letting the signal source select the destination address from a choice of programmed addresses. For this purpose, an embodiment of the local communication system is characterized, in that the signal output of the signal source is coupled to selection means, for selecting one of a plurality of programmed addresses for inserting it in the destination address field, the selection means being comprised in the frame forming device.

In one embodiment, more than one signal source is Connected to the frame forming device. This may be achieved by providing the frame forming device with more than one external input, connecting one device to each input, or by connecting several devices to one input which would thus also constitute a further shareable bus. In the latter case, the unspecific signals must comprise information characteristic of the source. In either case, the frame forming device, in an embodiment, is provided with means for selecting a programmed destination address in dependence of the source. In this way, several sources may share a frame forming device.

Frame forming devices of this type may be used in recursive fashion: consider a sequence of frame forming devices, where each frame forming device in the sequence is connected via a successive shareable bus to a next frame forming device in the sequence. The frame forming devices in the sequence are able to forward a signal, each frame forming device determining a successive next address (the address of the next frame forming the sequence on the bus connected to it, or destination address at the end of the this possible, it must be possible to determine the source of each source frame at the destination. For this purpose, it is advantageous that the frame forming devices comprise insertion means for inserting source information, characteristic of an identity of the frame forming device and the identity of the signal source, in the source frame.

In another embodiment of the local communication system according to the invention the signal source is provided for inserting into the unspecific signal a signal type indication, said signal type indication controlling said selection means. In this way, different types of signals may be sent to different destinations. For example, a normal signal may be sent to a normal destination, whereas an error status message is sent to an error destination.

BRIEF DESCRIPTION OF THE DRAWING

These and other attractive features of the invention will be described by means of a number of figures, of which FIG. 5 shows a frame forming device with blocking means FIG. 6 shows a communication system with selection means for selecting a programmed address FIG. 7 shows a communication system with a gateway between two busses.

DETAILED DESCRIPTION OF THE PREFERRED EMBODIMENT

Figure 1:
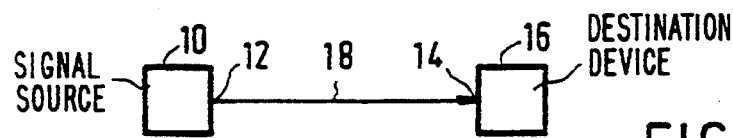
FIG. 1 shows a signal source and a destination device connected by a private connection

FIG. 1 depicts a circuit in which a signal source 10, has its output 12 connected to an input 14 of a destination device 16 via a connection 18. The figure abstracts common situations, such as when a switch 10 controls a lamp 16, or some other electrical appliance 16. In another example, the signal source 10 is a computer and the destination device 16 is a printer.

Usually, such signal sources produce destination of selecting a specific destination device in case that more than one destination device 16 is coupled to the connection 18. For example, a switch would control all lamps connected to it.

Figure 2:
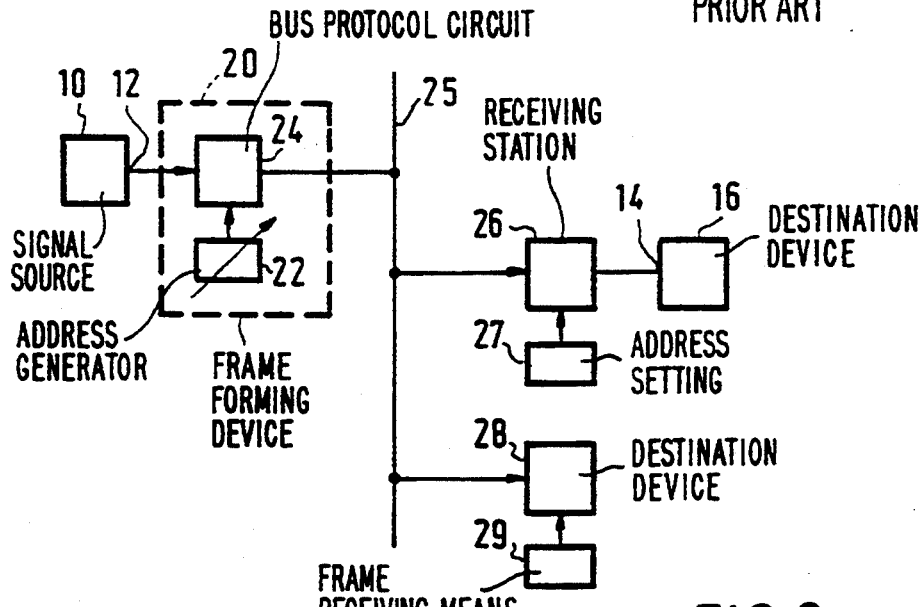
FIG. 2 shows a communication system connecting a signal source and a destination device via a bus

FIG. 2 shows a communication system for realizing an equivalent connection between a signal source and a destination device via a bus 25. Here too the signal source 10 is connected to the destination device 16. The important difference is that the bus is shared with another destination device 28 also connected to the bus. To make an effective connection only to a selected device 16 and not to another device 28, signals over the bus carry information in the form of frames.

Figure 3:
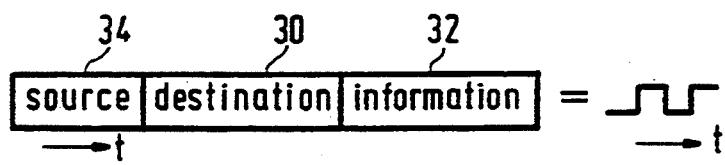
FIG. 3 shows a frame for transmission via a serial bus

FIG. 3 depicts a frame. In the frame, information bits are in a time sequence, for example as a binary signal across two wires. In the frame, there is a field 30 (a period of time) for coding a destination address, and one for coding information (32). An example of the use of frames in a bus system called the D²B system can be found in U.S. Pat. No. 4,429,384. In D²B frames also contain a source address 34, which is not essential in the present case.

Returning now to FIG. 2, the communication system comprises a frame forming device 20 which is provided for forming a frame in response to a signal received from the output 12 of the signal source 10. In the present system, the intelligence required for this response is concentrated in the frame forming device 20. The signal source remains unmodified as compared to FIG. 1, still producing destination unspecific signals at its output 12.

The frame forming device 20 contains circuitry 24 for generating appropriate signals for handling protocol on the bus. An example of such a protocol handling can be found in the D²B publication cited above. To fill in the content of the destination address field 30, the frame forming device 20 comprises an address generator 22. The address which this address generator 22 generates is programmable. In one implementation it is for example stored in a memory. This memory is preferably non-volatile (e.g. magnetic or an EEPROM), once an address is stored, each time the frame forming device 20 forms a source frame in response to a signal on the output 12, the stored address is read out and inserted in the destination field 30 of the source frame.

This frame is then transmitted via the bus 25. Suppose that the destination address of the frame corresponds to a destination address set on an address setting 27 of a receiving station 26 connected to the bus. In that case, the receiving station 26 will pass the information content of the signal to the destination device 16. The destination device 16 may also be unmodified, that is, intended for a direct connection 28 as in FIG. 1, without means for receiving frames from a bus. However, it is also possible that, like the other receiving device, 28 is designed specifically for use on a bus and contains means 29 for receiving frames itself.

With several measures that will not add very much to its complexity, the frame forming device can be made to provide greater flexibility to a communication system as in FIG. 2.

Figure 4:
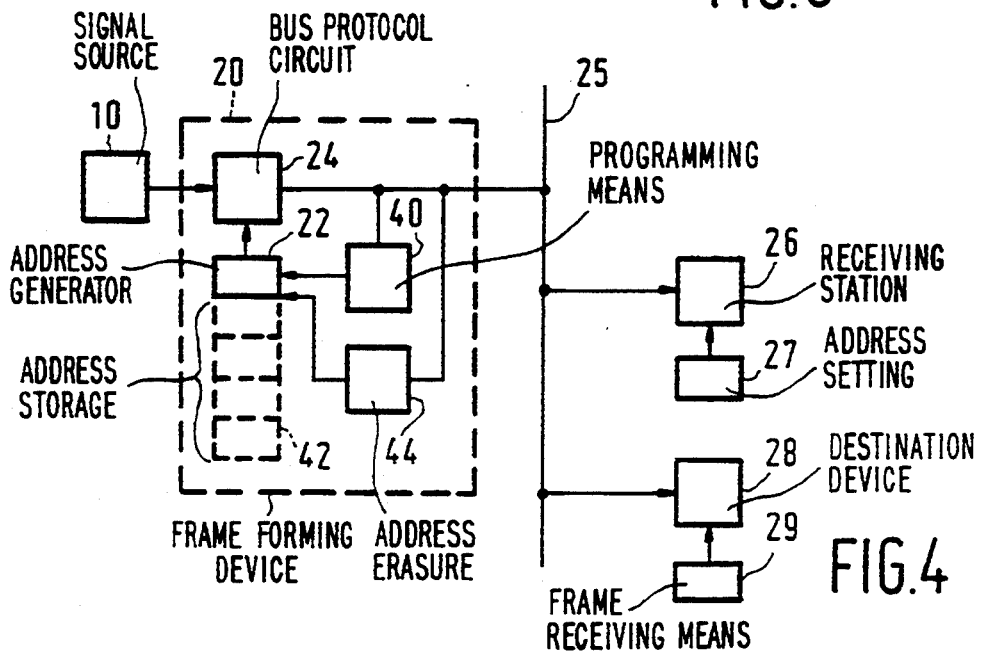
FIG. 4 shows a communication system with a bus programmable address generator
Figure 8:
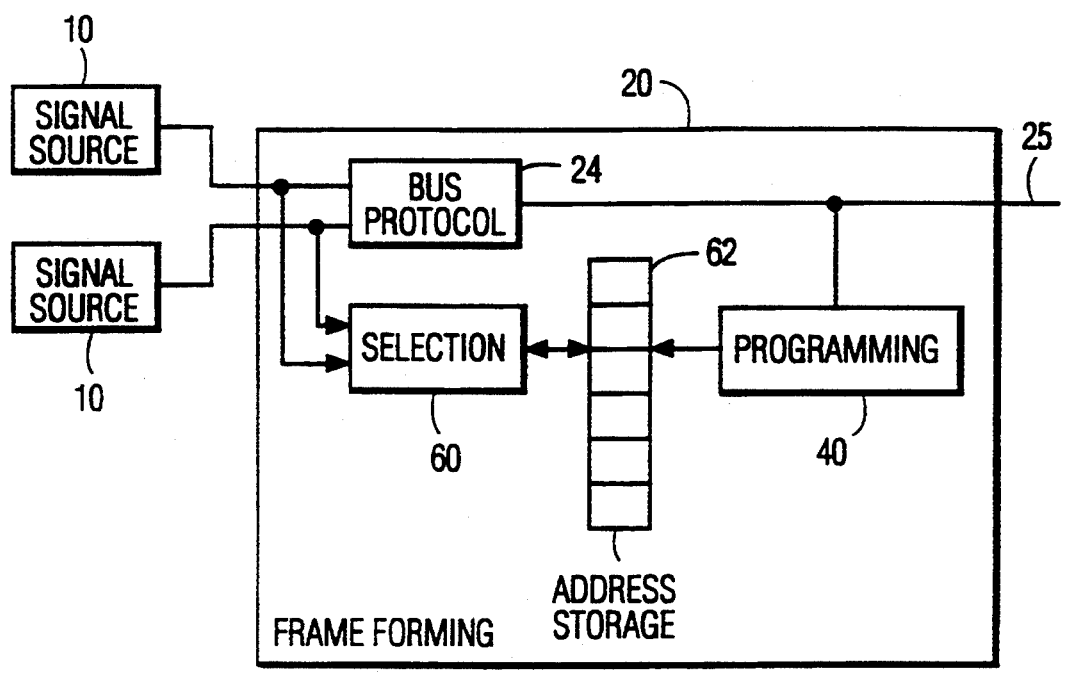

These measures involve flexibility in programming and controlling the address generator. In FIG. 4, several such measures are shown. For one thing, the frame forming device 20 comprises programming means 40. The programming means 40 themselves are activated via the bus 25, by a programming frame. Such a programming frame will have a destination address corresponding to the programming means and a content from which the address Which is programmed into the address generator 22 can be derived.

When it is desirable to reprogram the address generator, for example if the signal source is a push button at the door of a building and it must be connected to an alarm device in a specific room, (for example because the person for whom the alarm is intended moves to that room), this can be achieved by sending an appropriate programming frame via the bus: no extra wiring is needed for programming and no one needs to go to the push button (or its frame forming device) to program it.

The programming frame itself may originate from any transmitting station connected to the bus 25. For example, it may originate at a coordinating processor (not shown). After programming, the connection no longer requires any attention from the coordinating processor and is indifferent to failure of this processor.

In some applications, it is desirable that a signal reach a plurality of receiving stations. For example, a push button at the door might be connected to a plurality of alarm devices, or a light switch to a plurality of lamps. In these applications, it is desirable that the frame forming device can store a plurality of programmed addresses 42, one for each destination device. In reponse to the signal at the output 12, the frame forming device will send a pluralitity of source frames, each programmed address being contained in at least one of the frames. In one embodiment of the invention, one such frame may contain more than one of the programmed frames. In the preferred embodiment, each of the plurality of source frames contains just one of the plurality of programmed addresses, notably as destination address.

In other applications, it is desirable to disconnect a destination device 10 from the source device 16, for example, to disable a push button at the door. In principle, this can be achieved by programming an unused address, because this way source frames will not have any effect. However, this entails transmitting unneccessary messages on the bus, and does not account for the fact that in some applications it is desirable for the frame forming device to wait until an acknowledgement is received from the destination device, and to retry transmitting the frame if it is not acknowledged. Therefore, another embodimnent of the invention involves not sending a source frame at all. For this purpose, the frame forming device 20 must have address erasure means 44 for erasing a programmed address, and means for preventing the transmission of source frames if an address is erased. The erasure means 44 might be activated by a reset button at the device, but it is also possible to provide for control by a frame via the bus.

FIG. 5 shows a further elaboration of the frame forming device 20. In this figure, blocking means 50 have been added 50, for blocking the programming means 40 and, if present, the erasure means 44 have been added. The idea is that, upon reception of a blocking frame, the blocking means prevent reprogramming of the address generator 22 by the programming means. Later, the blocking can be removed after reception of an unblocking command. A purpose of blocking is to freeze the connection pattern of the frame forming device. For example, if the destination device 26 is a printer and the signal source 10 is a computer issuing printing commands which are transferred in successive frames to the printer 26, it would be undesirable that the destination of the frames is changed halfway, in between these successive frames. The blocking means serve to prevent this. Most often, it will be sufficient to combine the blocking function with the programming function: reprogramming will be blocked automatically after programming until the programmed addres is erased.

The frame forming device can also be made more flexible by letting the signal source influence the address generator.

FIG. 6 shows an example of this. In this figure, the frame forming device 20 comprises selection means 60 and a plurality of stored addresses 62. The selection means 60 are capable of selecting any one of the stored addresses 62 for insertion as destination address 30 in the source frame. The selection of the storage location is in this case controlled by the signal source 10.

In one example, the frame forming device has a plurality of inputs, the input at which a signal appears determining which storage location 62 is selected. In this way, one frame forming device 20 does the work of a plurality of separate frame forming devices for separate signal sources 10, with a corresponding saving on overhead.

In another example, a plurality of signal sources 10 is collectively connected to a single input of one frame forming device In this case, it is necessary that the signal source 10 can be identified from its signal, for example because the signal contains a source address. In this way a source specific, but destination unspecific signal is converted into a destination specific frame via a programmable "mapping" storage 62.

This embodiment can advantageously be used in a recursive application of the invention. In FIG. 7 the destination device 16 is replaced by a further frame forming device 20' connected to a further bus 25 and to a further receiving device 16'. In this case, the address generator in the "old" frame forming device 20, does not need to store the destination address of the further receiving device 16' beyond the further frame forming device 20', because this address will be generated by further selection means 60'. When the source frame transmitted by the original frame forming device 20 comprises a source identification characteristic of this frame forming device 20, such as for example a source address, the further selection means 60' will select a further destination address under control of this source identification.

This recursive application can be repeated indefinitely, adding further busses etcetera, provided each frame forming device arguments the frame with its own identification.

The alternative to this approach would be to store the full destination address (i.e. the addres of the further frame forming device 20' and the further destination device 16') in the original frame forming device 20. The advantage of the recursive approach is that the destination information is distributed, which reduces the intelligence required in the original frame forming device 20 because it now needs no knowledge of the further bus 25'.

In another embodiment of the invention, the selection means 60 are controlled by the type of signal produced by the source 10. For example, the message might be from one of the following types: control signal, status signal, error signal. By letting the type control the destination, for example error signals may go to a different destination than control signals, as determined by the programming of the plurality of destination addresses 62.

Although in the preceding various measures in the frame forming device 20 have been shown as implemented through separate units, it shall be clear that such things as address separation, frame forming, programming, erasing, blocking, selection etcetera can also be implemented in a single processor capable of interfacing to the bus.

I claim:

1. A local communication system for controlling a destination device comprising
   a plurality of signal source devices, each supplying a respective destination unspecific source signal;
   a frame forming device, separately encapsulated from said signal source devices, having
      an input for receiving said source signals;
      an address generator for inserting a preprogrammed destination address into a source frame formed in response to said source signal, the preprogrammed destination address depending upon which source device originated the source signal;
   a shareable serial bus for interconnecting said signal source devices and said destination device;
   recognition means, within the destination device, for recognizing a particular destination address within said source frame; and
   programming means for programming said address generator
   whereby the source signal devices do not need to specify a destination address.

2. Local communication system according to claim 1, further comprising a coordinating processor for transmitting, via the shareable bus, programming frames, including a destination field containing a frame forming device address, and
   wherein the programming means, in response to reception of the programming frame from the shareable bus, derives a programming address from a content of the programming frame for programming the address generator.

3. Local communication system according to claim 2 further comprising
   a blocking unit for transmitting, via the shareable bus, a blocking frame, destined for the frame forming device, and
   blocking means, in the frame forming device, for blocking programming of the address generator in response to the blocking frame and
   wherein the programming frame serves as the blocking frame.

4. Local communication system according to claim 1, wherein the frame forming device comprises erasure means for, after reception of an erasure command, preventing a transmission of the source frame.

5. Local communication system according to claim 4, further comprising physically actuable reset means in the frame forming device for controlling the erasure means.

6. Local communication system according to claim 4, further comprising an erasure processor for transmitting, on the shareable bus, an erasure frame containing the erasure command destined for the frame forming device, and
   wherein the erasure means is responsive to the erasure frame from the shareable bus.

7. Local communication system, according to claim 1, further comprising
   a blocking unit for transmitting, via the shareable bus, a blocking frame, destined for the frame forming device, and
   blocking means, in the frame forming device, for blocking programming of the address generator in response to the blocking frame.

8. Local communication system according the claim 1, characterized, in that the address generator comprises a non-volatile, writable memory for storing any programmed address.

9. The system of claim 1 wherein the frame forming device comprises a plurality of inputs and said address generator discriminates between the source devices according to which of the plurality of inputs the source signal appears on.

10. The system of claim 1 wherein the source device inserts source specific information into the source signal and the address generator discriminates between the source devices according to the source specific information.

11. A frame forming device for use in a local communication bus system comprising
an input for receiving a plurality of respective destination unspecific source signals from each of a plurality of separately encapsulated source signal devices;
means for supplying a respective source frame to a shareable bus in response to each source signal;
an address generator for inserting a preprogrammed destination address into each respective source frame, the preprogrammed destination address, the preprogrammed destination address depending on which of the source devices originated the source signal from which the respective source frame was formed; and
means for programming said generator;
whereby the source signal devices do not need to specify a destination address.

12. The device of claim 11, wherein
the address generator comprises storage means for storing a plurality of programmed addresses; and
further comprising sequence forming means for forming a sequence of source frames in response to the source signals, at least two of the sequence of source frames containing different ones of the preprogrammed addresses.

13. The system of claim 12 wherein the signal source device comprises a further signal source device coupled to a further frame forming device coupled to supply destination unspecific frames to the input of the frame forming device in response to a further destination unspecific signal from the further signal source device, the destination unspecific frames including source identifying information, identifying both the further signal source device and the further frame forming device.

14. The device of claim 11 wherein the address generator discriminates between signal source devices based on source identifying information in the source signals.

15. The device of claim 11 wherein the input comprises a plurality of external inputs and the address generator discriminates between signal sources based on which external input the source signals come in on.

16. The device of claim 11 wherein the programming means are responsive to a programming frame received from the shareable bus.

17. The device of claim 11 comprising blocking means, responsive to a blocking frame received from the shareable bus, for blocking action of said programming means.

18. The device of claim 11, further comprising erasure means for, after reception of an erasure command, preventing a transmission of the source frame.

19. The device of claim 18, further comprising physically actuable reset means for controlling the erasure means.

20. Local communication system comprising
a signal source with a signal output for supplying a destination unspecific signal;
a serial, shareable bus;
a frame forming device, physically separate from the signal source, for forming, in response to the destination unspecific signal, a source frame over the serial shareable bus, the source frame comprising a destination address field containing a programmed address;
a programmable address generator, within the frame forming device, for generating the programmed address; and
a frame receiving device, coupled with the shareable bus, responsive to the destination address,
wherein the address generator comprises storage means, for storing a plurality of programmed addresses, and the frame forming means includes sequence forming means for forming a sequence of source frames in response to the destination unspecific signal, at least two of the sequence of source frames including different ones of the programmed addresses,
whereby the source device does not need to supply a destination address.

21. Local communication system comprising
a signal source with a signal output for supplying a destination unspecific signal;
a serial, shareable bus;
a frame forming device, physically separate from the signal source, for forming, in response to the destination unspecific signal, a source frame over the serial shareable bus, the source frame comprising a destination address field containing a programmed address;
a programmable address generator, within the frame forming device, for generating the programmed address; and
a frame receiving device, coupled with the shareable bus, responsive to the destination address,
wherein the frame forming device comprises erasure means, for, after reception of an erasure command, preventing a transmission of the source frame.

22. The system of claim 21 further comprising physically actuable reset means in the frame forming device for controlling the erasure means.

23. The system of claim 21 further comprising an erasure processor, for transmitting an erasure frame containing the erasure command to the shareable bus, destined for the frame forming device.

24. Local communication system comprising
a signal source with a signal output for supplying a destination unspecific signal;
a serial, shareable bus;
a frame forming device, physically separate from the signal source, for forming, in response to the destination unspecific signal, a source frame over the serial shareable bus, the source frame comprising a destination address field containing a programmed address;
a programmable address generator, within the frame forming device, for generating the programmed address; and
a frame receiving device, coupled with the shareable bus, responsive to the destination address,
a blocking unit for transmitting via the shareable bus a blocking frame destined for the frame forming device, and
blocking means, within the frame forming device, for blocking programming of the address generator in response to the blocking frame.

25. The system of claim 24 further comprising:
a coordinating processor for transmitting, via the shareable bus, programming frames including a frame forming device address, and
programming means, within the frame forming device, for deriving the programmed address from a content of the programming frame and thereby programming the address generator.

26. The system of claim 25 wherein the programming frame serves as the blocking frame.

* * * * *